United States Patent
Nagai

(10) Patent No.: US 12,010,378 B2
(45) Date of Patent: Jun. 11, 2024

(54) WIRELESS COMMUNICATION DEVICE AND METHOD FOR CONTROLLING WIRELESS COMMUNICATION DEVICE

(71) Applicant: SEIKO EPSON CORPORATION, Tokyo (JP)

(72) Inventor: Kazuki Nagai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/983,845

(22) Filed: Nov. 9, 2022

(65) Prior Publication Data

US 2023/0156271 A1 May 18, 2023

(30) Foreign Application Priority Data

Nov. 12, 2021 (JP) ................................. 2021-184965

(51) Int. Cl.
*H04N 21/4363* (2011.01)
*G06F 3/147* (2006.01)

(52) U.S. Cl.
CPC ....... *H04N 21/43637* (2013.01); *G06F 3/147* (2013.01); *H04N 21/43635* (2013.01)

(58) Field of Classification Search
CPC ....... H04N 21/43637; H04N 21/43635; G09G 2370/12; G09G 2370/16
USPC ......................................................... 725/81
See application file for complete search history.

(56) References Cited

U.S. PATENT DOCUMENTS

| | | | | |
|---|---|---|---|---|
| 2010/0164300 A1* | 7/2010 | Takezaki | ........... | H04W 52/0229 307/116 |
| 2014/0372558 A1* | 12/2014 | Fontaine | ............. | H04L 12/2838 709/217 |
| 2015/0006673 A1 | 1/2015 | Nair | | |
| 2015/0067758 A1* | 3/2015 | Jeanne | ............... | H04N 21/4222 725/151 |
| 2015/0234770 A1* | 8/2015 | Koyanagi | ........... | H04L 43/0811 710/302 |

(Continued)

FOREIGN PATENT DOCUMENTS

CN 204859449 U * 12/2015
JP 2015-053631 A 3/2015

(Continued)

OTHER PUBLICATIONS

User's guide EH-TW5750 Home Projector/Author : Seiko Epson Corporation/Date : 2020.

*Primary Examiner* — Cynthia M Fogg
(74) *Attorney, Agent, or Firm* — Dority & Manning, P.A.

(57) ABSTRACT

A wireless communication device includes a first wireless communication circuit, a first terminal, and a processor. The first wireless communication circuit executes receiving first image information by a first wireless communication method, and transmitting wireless connection destination information. The processor executes adding information representing that communication is performed by the first wireless communication method to the wireless connection destination information, when the first terminal is coupled to a display device, and not adding the information representing that communication is performed by the first wireless communication method to the wireless connection destination information, when the first terminal is not coupled to the display device.

6 Claims, 3 Drawing Sheets

(56) References Cited

U.S. PATENT DOCUMENTS

2016/0261905 A1    9/2016  Aruga et al.
2016/0350058 A1*  12/2016  Zhu .................... H04N 21/4126
2018/0152976 A1*   5/2018  Baron ................... H04W 76/23

FOREIGN PATENT DOCUMENTS

| JP | 2016-009913 A | 1/2016 |
| JP | 2016-058917 A | 4/2016 |
| JP | 2019-169905 A | 10/2019 |
| WO | WO2014/207899 A | 12/2014 |

* cited by examiner

WIRELESS COMMUNICATION DEVICE AND METHOD FOR CONTROLLING WIRELESS COMMUNICATION DEVICE The present application is based on, and claims priority from JP Application Serial Number 2021-184965, filed Nov. 12, 2021, the disclosure of which is hereby incorporated by reference herein in its entirety.

BACKGROUND

1. Technical Field

The present disclosure relates to a wireless communication device and a method for controlling a wireless communication device.

2. Related Art

A technique of transmitting video data from a wireless dongle to a display device is known.

For example, JP-A-2015-53631 describes an HDMI (trademark registered) dongle that enables image transmission utilizing a wireless communication function to a display device having no wireless communication function. The HDMI dongle transmits image data received via a wireless communication interface to the display device via an HDMI interface.

However, the HDMI dongle described in JP-A-2015-53631 may not necessarily have an HDMI cable coupled to the display device. If the HDMI dongle receives image data in the state where the HDMI cable is not coupled to the display device, an image is not displayed on the display device and therefore an operation intended by the user who has transmitted the image is not executed.

SUMMARY

According to an aspect, a wireless communication device includes: a first wireless communication device receiving first image information by a first wireless communication method; a first terminal; and a processor executing adding information representing that communication is performed by the first wireless communication method to wireless connection destination information transmitted from the first wireless communication device, when the first terminal is coupled to a display device, and not adding the information representing that communication is performed by the first wireless communication method to the wireless connection destination information, when the first terminal is not coupled to the display device.

According to another aspect, a method for controlling a wireless communication device includes: receiving first image information by a first wireless communication method, using a wireless communication device; outputting the first image information to a display device via a first terminal; adding information representing that communication is performed by the first wireless communication method to wireless connection destination information transmitted from the wireless communication device, when the first terminal is coupled to a display device; and not adding the information representing that communication is performed by the first wireless communication method to the wireless connection destination information, when the first terminal is not coupled to the display device.

DESCRIPTION OF EXEMPLARY EMBODIMENTS

An embodiment will now be described with reference to the drawings.

Figure 1:
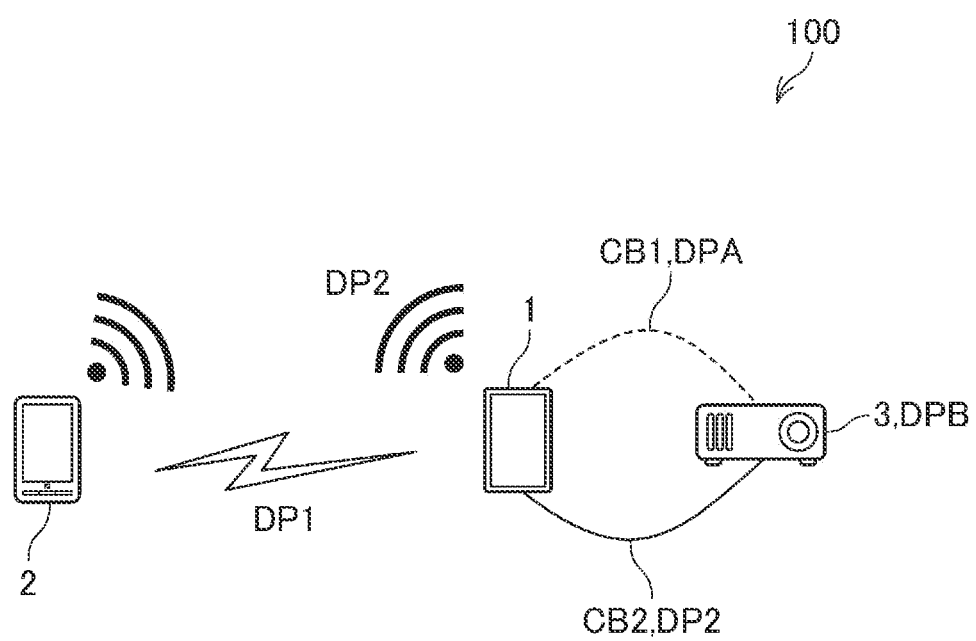
FIG. 1 shows an example of the configuration of a communication system according to an embodiment.

FIG. 1 shows an example of the configuration of a communication system 100 according to this embodiment. The communication system 100 has a wireless dongle 1, a smartphone 2, and a projector 3.

The wireless dongle 1 is communicatively connected to the smartphone 2 in conformity with the Miracast (trademark registered) standard. The wireless dongle 1 is also communicatively connected to the smartphone 2 in conformity with the Wi-Fi (trademark registered) standard.

When communicatively connected to the smartphone 2 in conformity with the Miracast standard, the wireless dongle 1 receives image information DP1 corresponding to an image displayed on an LCD (liquid crystal display) of the smartphone 2.

When communicatively connected to the smartphone 2 in conformity with the Wi-Fi standard, the wireless dongle 1 receives image information DP2 corresponding to various images in response to a user's instruction to the smartphone 2.

The wireless dongle 1 is equivalent to an example of a "wireless communication device". The Miracast standard is equivalent to an example of a "first wireless communication method". The Wi-Fi standard is equivalent to a "second wireless communication method". The image information DP1 is equivalent to an example of "first image information". The image information DP2 is equivalent to an example of "second image information".

The wireless dongle 1 is communicatively connected to the projector 3, for example, in conformity with the HDMI (High-Definition Multimedia Interface, trademark registered) standard. The projector 3 is communicatively connected to the wireless dongle 1 via an HDMI cable CB1.

When the wireless dongle 1 is communicatively connected to the projector 3 via the HDMI cable CB1, the wireless dongle 1 decodes the image information DP1 and transmits image information DPA after the decoding to the projector 3 via the HDMI cable CB1. The projector 3 projects an image corresponding to the image information DPA received from the wireless dongle 1, onto a screen. That is, the projector 3 executes the mirroring of the smartphone 2 via the wireless dongle 1.

The wireless dongle 1 is also communicatively connected to the projector 3, for example, in conformity with the USB (Universal Serial Bus, trademark registered) standard. The projector 3 is communicatively connected to the wireless dongle 1 via a USB cable CB2.

When the wireless dongle 1 is connected to the projector 3 via the USB cable CB2, the wireless dongle 1 is supplied with power from the projector 3 via the USB cable CB2. The wireless dongle 1 transmits the image information DP2 to the projector 3 via the USB cable CB2. The projector 3 decodes the image information DP2 received from the wireless dongle 1 and projects an image corresponding to image information DPB after the decoding, onto the screen.

The projector 3 is equivalent to an example of a "display device".

Figure 2:
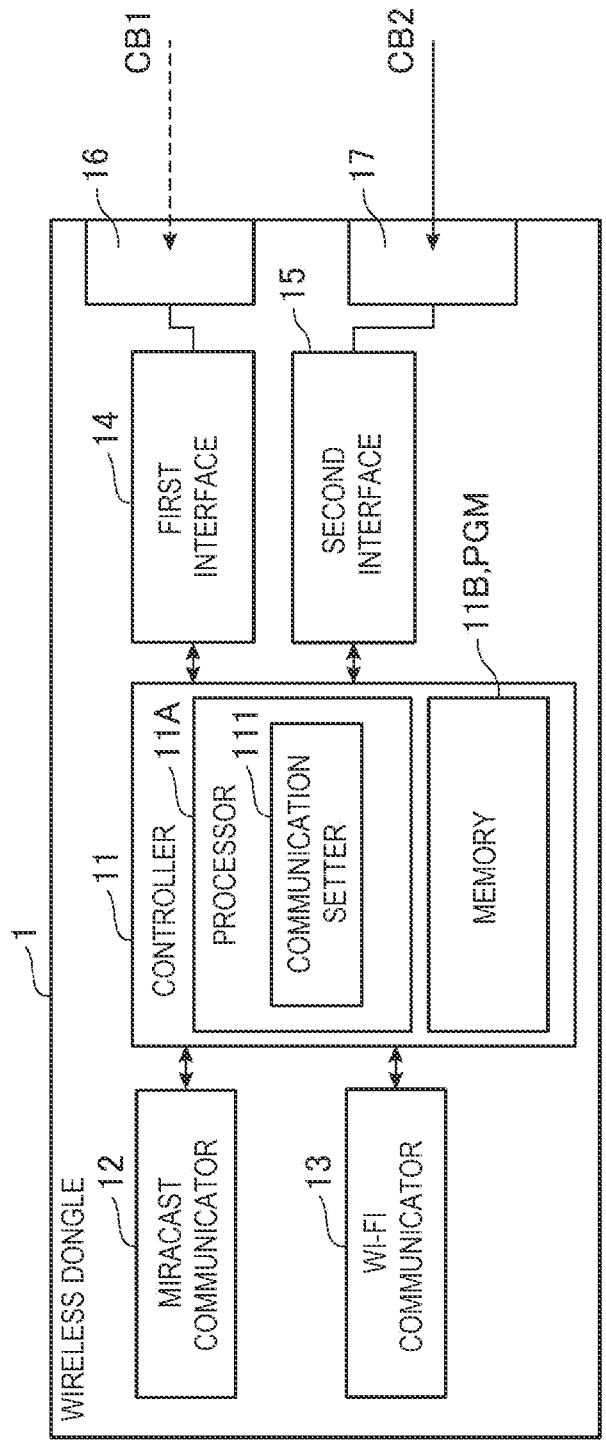
FIG. 2 shows an example of the configuration of a wireless dongle according to the embodiment.

The configuration of the wireless dongle 1 will now be described with reference to FIG. 2. FIG. 2 shows an example of the configuration of the wireless dongle 1 according to this embodiment.

As shown in FIG. 2, the wireless dongle 1 has a controller 11, a Miracast communicator 12, a Wi-Fi communicator 13, a first interface 14, a second interface 15, a first terminal 16, and a second terminal 17.

The controller 11 has a processor 11A such as a CPU (central processing unit) or an MPU (micro-processing unit), and a memory 11B such as a ROM (read-only memory) or a RAM (random-access memory). The controller 11 controls each part of the wireless dongle 1.

The memory 11B stores a control program PGM.

The Miracast communicator 12 is communicatively connected to the smartphone 2 in conformity with the Miracast standard according to an instruction from the controller 11. The Miracast communicator 12 has a receiving circuit receiving the image information DP1 from the smartphone 2 in conformity with the Miracast standard, and a processing circuit outputting the received image information DP1 to the controller 11, or the like.

The Wi-Fi communicator 13 is communicatively connected to the smartphone 2 in conformity with the Wi-Fi standard according to an instruction from the controller 11. The Wi-Fi communicator 13 has a receiving circuit receiving the image information DP2 from the smartphone 2 in conformity with the Wi-Fi standard, and a processing circuit outputting the received image information DP2 to the controller 11, or the like.

The Miracast communicator 12 is equivalent to an example of a "first wireless communication circuit". The Wi-Fi communicator 13 is equivalent to an example of a "second wireless communication circuit".

The HDMI cable CB1 is coupled to the first terminal 16. The HDMI cable CB1 communicatively connects the wireless dongle 1 and the projector 3 in conformity with the HDMI standard.

The USB cable CB2 is coupled to the second terminal 17. The USB cable CB2 communicatively connects the wireless dongle 1 and the projector 3 in conformity with the USB standard. The USB cable CB2 also couples the wireless dongle 1 and the projector 3 in such a way as to be able to supply power in conformity with the USB standard.

The first interface 14 has an interface circuit and communicatively connects the projector 3 and the controller 11 in conformity with the HDMI standard. The first interface 14 is communicatively connected to the projector 3 in conformity with the HDMI standard via the HDMI cable CB1 installed at the first terminal 16.

The second interface 15 has an interface circuit and communicatively connects the projector 3 and the controller 11 in conformity with the USB standard. The second interface 15 is communicatively coupled to the projector 3 in conformity with the USB standard via the USB cable CB2 installed at the second terminal 17.

The second interface 15 is also coupled to the projector 3 in such a way as to be able to be supplied with power via the USB cable CB2 installed at the second terminal 17. The second interface 15 has a power-supply circuit and supplies the power supplied from the projector 3, to each part of the wireless dongle 1.

The controller 11 of the wireless dongle 1 will now be described.

The controller 11 has a communication setter 111 as a functional unit. Specifically, the processor 11A executes the control program PGM stored in the memory 11B and thus functions as the communication setter 111.

The communication setter 111 determines whether the first terminal 16 is communicatively coupled to the projector 3 via the HDMI cable CB1 or not.

When the first terminal 16 is not communicatively coupled to the projector 3 via the HDMI cable CB1, the communication setter 111 does not add IE (information elements) for Miracast to L2 discovery information. The L2 discovery information is transmitted for the Miracast communicator 12 to implement P2P (peer-to-peer) connection based on Wi-Fi Direct.

The L2 discovery information is equivalent to an example of "wireless connection destination information". The IE for Miracast is equivalent to an example of "information representing that communication is performed by the first wireless communication method".

In this way, when the first terminal 16 is not communicatively coupled to the projector 3 via the HDMI cable CB1, the communication setter 111 does not add the IE for Miracast to the L2 discovery information. Therefore, the Miracast communicator 12 cannot connect to the smartphone 2. Thus, the Miracast communicator 12 cannot execute communication conforming to the Miracast standard with the smartphone 2.

When the first terminal 16 is communicatively coupled to the projector 3 via the HDMI cable CB1, the communication setter 111 adds the IE for Miracast to the L2 discovery information.

In this way, when the first terminal 16 is communicatively coupled to the projector 3 via the HDMI cable CB1, the communication setter 111 adds the IE for Miracast to the L2 discovery information. Therefore, the Miracast communicator 12 can connect to the smartphone 2. Thus, the Miracast communicator 12 can execute communication conforming to the Miracast standard with the smartphone 2.

When a hot-plug-detect (HPD) signal from the first terminal 16 changes from on to off while the Miracast communicator 12 is executing the communication conforming to the Miracast standard with the smartphone 2, the communication setter 111 causes the Miracast communicator 12 to maintain the communication conforming to the Miracast standard.

That the HPD signal from the first terminal 16 changes from on to off means that the HDMI cable CB1 coupled to the first terminal 16 changes into an uncoupled state with the first terminal 16.

In this way, when the HPD signal from the first terminal 16 changes from on to off while the Miracast communicator 12 is executing the communication conforming to the Miracast standard with the smartphone 2, the Miracast communicator 12 maintains the communication conforming to the Miracast standard with the smartphone 2. Therefore, when the HDMI cable CB1 is coupled to the first terminal 16 again and the communication with the projector 3 is enabled, the projector 3 can project an image corresponding to the image information DPA received from the wireless dongle 1, onto the screen. Thus, the convenience of the user can be improved.

Figure 3:
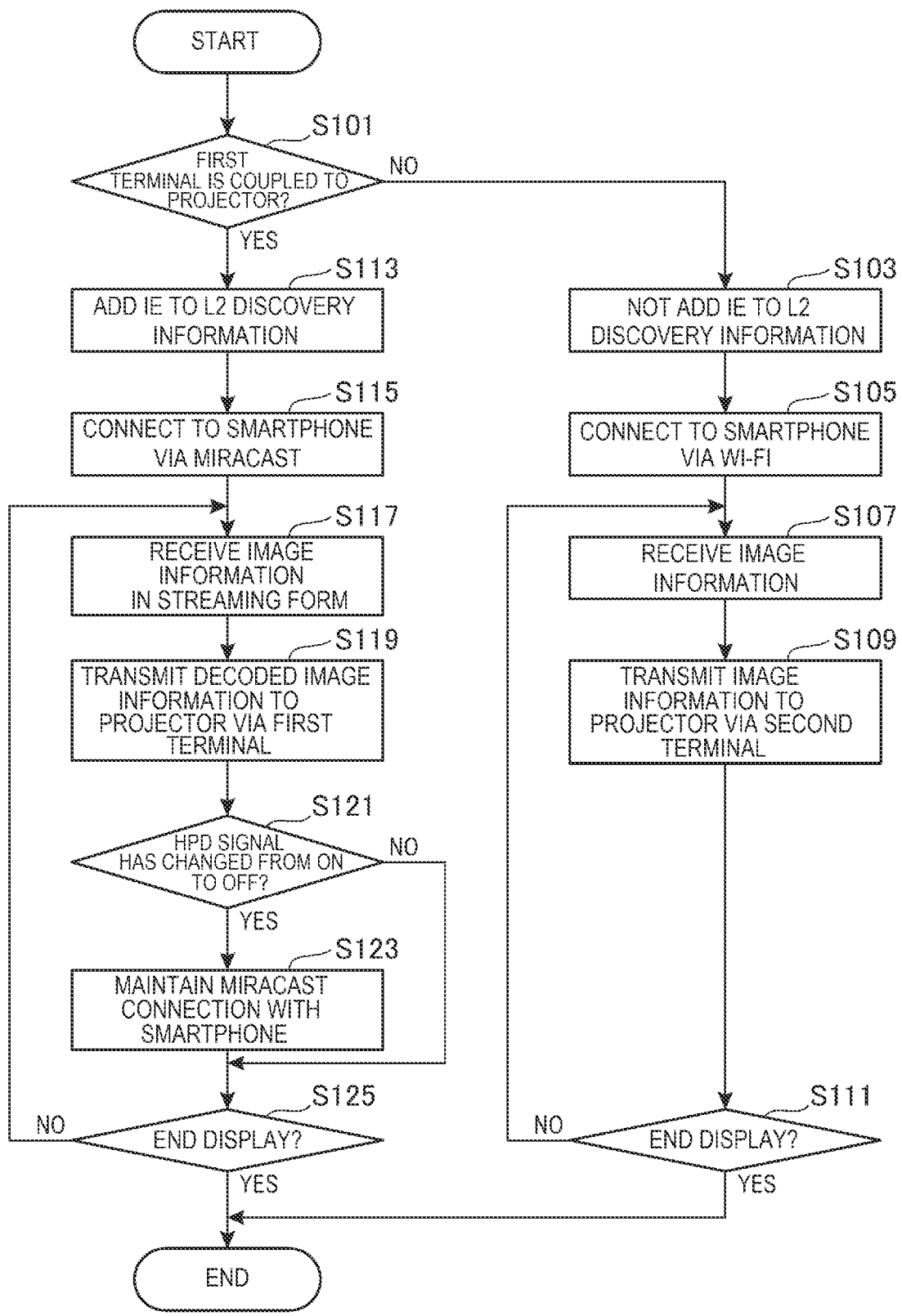
FIG. 3 is a flowchart showing an example of processing by a controller.

The processing by the controller 11 will now be described with reference to FIG. 3. FIG. 3 is a flowchart showing an example of the processing by the controller 11.

As shown in FIG. 3, first, in step S101, the communication setter 111 determines whether the first terminal 16 is communicatively coupled to the projector 3 via the HDMI cable CB1 or not.

When the communication setter 111 determines that the first terminal 16 is communicatively coupled to the projector 3 via the HDMI cable CB1 (YES in step S101), the processing proceeds to step S113. When the communication setter 111 determines that the first terminal 16 is not communicatively coupled to the projector 3 via the HDMI cable CB1 (NO in step S101), the processing proceeds to step S103.

In step S103, the communication setter 111 does not add the IE for Miracast to the L2 discovery information.

In step S105, the controller 11 causes the Wi-Fi communicator 13 to communicatively connect to the smartphone 2.

In step S107, the controller 11 causes the Wi-Fi communicator 13 to receive the image information DP2 from the smartphone 2.

In step S109, the controller 11 causes the Wi-Fi communicator 13 to transmit the image information DP2 to the projector 3 via the second interface 15, the second terminal 17, and the USB cable CB2. The projector 3 decodes the image information DP2 and projects an image corresponding to the image information DPB after the decoding, onto the screen.

In step S111, the controller 11 determines whether to end the display of the image by the projector 3 or not, for example, based on a user's instruction to the projector 3. The controller 11 acquires information representing the user's instruction to the projector 3, from the projector 3, for example, via the USB cable CB2.

When the controller 11 determines that the display of the image by the projector 3 is not to be ended (NO in step S111), the processing returns to step S107. When the controller 11 determines that the display of the image by the projector 3 is to be ended (YES in step S111), the processing subsequently ends.

When YES in step S101, that is, when the communication setter 111 determines that the first terminal 16 is communicatively coupled to the projector 3 via the HDMI cable CB1, the communication setter 111 adds the IE for Miracast to the L2 discovery information in step S113.

In step S115, the controller 11 causes the Miracast communicator 12 to communicatively connect to the smartphone 2.

In step S117, the controller 11 causes the Miracast communicator 12 to receive the image information DP1 in a streaming form from the smartphone 2.

In step S119, the controller 11 transmits the image information DPA formed by decoding the image information DP1 to the projector 3 via the first terminal 16 and the HDMI cable CB1. The projector 3 projects an image corresponding to the received image information DPA onto the screen.

In step S121, the communication setter 111 determines whether the HPD signal from the first terminal 16 has changed from on to off or not.

When the communication setter 111 determines that the HPD signal from the first terminal 16 has not changed from on to off (NO in step S121), the processing proceeds to step S125. When the communication setter 111 determines that the HPD signal from the first terminal 16 has changed from on to off (YES in step S121), the processing proceeds to step S123.

In step S123, the communication setter 111 causes the Miracast communicator 12 to maintain the connection with the smartphone 2.

In step S125, the controller 11 determines whether to end the display of the image by the projector 3 or not, for example, based on a user's instruction to the projector 3.

When the controller 11 determines that the display of the image by the projector 3 is not to be ended (NO in step S125), the processing returns to step S117. When the controller 11 determines that the display of the image by the projector 3 is to be ended (YES in step S125), the processing subsequently ends.

As described with reference to FIGS. 1 to 3, the wireless dongle 1 according to this embodiment has the Miracast communicator 12 receiving the image information DP1 in conformity with the Miracast standard, the first terminal 16, and the processor 11A executing adding the IE (information elements) for Miracast to the L2 discovery information transmitted from the wireless dongle 1 when the first terminal 16 is coupled to the projector 3, and not adding the IE for Miracast to the L2 discovery information when the first terminal 16 is not coupled to the projector 3.

In this configuration, when the first terminal 16 is coupled to the projector 3, the communication setter 111 adds the IE for Miracast to the L2 discovery information transmitted from the wireless dongle 1. Therefore, the Miracast communicator 12 is communicatively connected, for example, to the smartphone 2 in conformity with the Miracast standard. Thus, the user can make the wireless dongle 1 execute an operation intended by the user.

When the first terminal 16 is not coupled to the projector 3, the communication setter 111 does not add the IE for Miracast to the L2 discovery information. Thus, the Miracast communicator 12 is not communicatively connected, for example, to the smartphone 2. Meanwhile, for example, the Wi-Fi communicator 13 is communicatively connected to the smartphone 2 in conformity with the Wi-Fi standard. Thus, the user can make the wireless dongle 1 execute an operation intended by the user.

In the wireless dongle 1, when the hot-plug-detect signal from the first terminal 16 has changed from on to off while the Miracast communicator 12 is executing communication conforming to the Miracast standard, the Miracast communicator 12 maintains the communication conforming to the Miracast standard.

In this configuration, when the hot-plug-detect signal from the first terminal 16 has changed from on to off, that is, when the first terminal 16 has shifted from the state of being coupled to the projector 3 to the state of not being coupled to the projector 3, the communication conforming to the Miracast standard is maintained.

Thus, when the first terminal 16 has shifted to the state of being coupled to the projector 3 again, the Miracast communicator 12 is communicatively connected to the smartphone 2 that is connected to the Miracast communicator 12 before the hot-plug-detect signal changes from on to off, for example. Therefore, the wireless dongle 1 can acquire the image information DP1 from the smartphone 2, for example. Thus, the convenience of the user can be improved.

The wireless dongle 1 also has the Wi-Fi communicator 13 receiving the image information DP2 in conformity with the Wi-Fi standard, and the second terminal 17, which is different from the first terminal 16. When receiving the image information DP1 in conformity with the Miracast standard, the Miracast communicator 12 decodes the image information DP1 in conformity with the Wi-Fi standard. When the Wi-Fi communicator 13 receives the image information DP2 in conformity with the Wi-Fi standard, the processor 11A transmits the image information DP2 to the projector 3. When receiving the image information DP2 via the second terminal 17, the projector 3 decodes the image information DP2.

In this configuration, in the communication conforming to the Miracast standard, the wireless dongle 1 decodes the received image information DP1. Therefore, the projector 3 need not decode the image information DP1. Thus, the processing load on the projector 3 can be reduced.

In the communication conforming to the Wi-Fi standard, the projector 3 decodes the received image information DP2. Therefore, the wireless dongle 1 need not decode the image information DP2. Thus, the processing load on the wireless dongle 1 can be reduced.

In the wireless dongle 1, the first terminal 16 is an HDMI terminal and the second terminal 17 is a USB terminal.

In this configuration, since the first terminal 16 is an HDMI terminal, the wireless dongle 1 and the projector 3 are communicatively coupled in conformity with the HDMI standard via the HDMI cable CB1. Therefore, the image information DPA formed by the wireless dongle 1 decoding the image information DP1 received when the Miracast communicator 12 is communicatively connected to the smartphone 2 in conformity with the Miracast standard can be efficiently transmitted to the projector 3.

Also, since the second terminal 17 is a USB terminal, the wireless dongle 1 and the projector 3 are communicatively coupled in conformity with the USB standard via the USB cable CB2. Therefore, the power supplied from the projector 3 can be supplied to each part of the wireless dongle 1. Also, the image information DP2 received when the Wi-Fi communicator 13 is communicatively connected to the smartphone 2 in conformity with the Wi-Fi standard can be transmitted to the projector 3.

The method for controlling the wireless dongle 1 according to this embodiment includes: receiving the image information DP1 in conformity with the Miracast standard, using the Miracast communicator 12; outputting the image information DP1 to the projector 3 via the first terminal 16; adding the IE (information elements) for Miracast to the L2 discovery information transmitted from the wireless dongle 1 when the first terminal 16 is coupled to the projector 3; and not adding the IE for Miracast to the L2 discovery information when the first terminal 16 is not coupled to the projector 3.

Thus, the method for controlling the wireless dongle 1 according to this embodiment has effects similar to the effects of the wireless dongle 1 according to this embodiment.

This embodiment simply represents an aspect of the present disclosure and can be modified and applied in any form within the scope of the present disclosure.

For example, the case where the wireless communication device according to the embodiment is the wireless dongle 1 is described. However, this is not limiting. The wireless communication device may be not a dongle, for example. In other words, the size of the wireless communication device is not particularly limited.

In the embodiment, the case where the first wireless communication method is communication conforming to the Miracast standard is described. However, this is not limiting. The first wireless communication method may be, for example, communication conforming to the AirPlay (trademark registered) standard.

In the embodiment, the case where the second wireless communication method is communication conforming to the Wi-Fi standard is described. However, this is not limiting. The second wireless communication method may be, for example, communication conforming to the Bluetooth (trademark registered) standard.

In the embodiment, the case where the display device is the projector 3 is described. However, this is not limiting. The display device may be, for example, an LCD.

In the embodiment, the case where the wireless dongle 1 receives image information from the smartphone 2 is described. However, this is not limiting. The wireless dongle 1 may receive image information, for example, from a personal computer. The wireless dongle 1 may also receive image information from a server device, for example, via the internet.

Each functional unit shown in FIG. 2 represents a functional configuration and is not particularly limited to any specific form of installation. That is, a piece of hardware corresponding individually to each functional unit need not necessarily be installed. A single processor may be configured to execute a program to implement functions of a plurality of functional units. A part of the functions implemented by software in the embodiment may be implemented by hardware. Alternatively, a part of the functions implemented by hardware may be implemented by software. Also, the specific detailed configuration of each part of the wireless dongle 1 can be changed in any manner without departing from the scope of the present disclosure.

For example, the processing steps in the flowchart of FIG. 3 are provided by dividing the processing according to the main content of the processing in order to facilitate the understanding of the processing by the controller 11. The way the processing is divided into processing steps and the names of the processing steps do not limit the present disclosure. The processing may be divided into more processing steps according to the content of the processing. The processing may be divided in such a way that one processing step includes more processing. The order of the processing steps may be changed where appropriate within a scope that does not affect the spirit and scope of the present disclosure.

The method for controlling the wireless dongle 1 can be implemented by causing the processor 11A of the controller 11 to execute the control program PGM stored in the memory 11B. The control program PGM can also be recorded in a computer-readable recording medium.

As the recording medium, a magnetic or optical recording medium or a semiconductor memory device can be used. Specifically, a portable recording medium such as a flexible disk, an HDD (hard disk drive), a CD-ROM (compact disk read-only memory), a DVD (digital versatile disc), a Blu-ray (trademark registered) disc, a magneto-optical disc, a flash memory or a card-type recording medium, or a fixed recording medium may be employed.

The recording medium may also be a non-volatile storage device such as a RAM, a ROM or an HDD that is an internal storage device provided in the wireless dongle 1. The functional blocks in the controller 11 of the wireless dongle 1 can also be implemented by storing the control program PGM in a server device or the like in advance and downloading the control program PGM from the server device to the controller 11 of the wireless dongle 1.

What is claimed is:

1. A wireless communication device comprising:
   a first wireless communication circuit executing
      receiving first image information by a first wireless communication method, and
      wirelessly transmitting wireless connection destination information for communicatively coupling to the wireless communication device;
   a first terminal; and
   a processor executing adding information representing that communication is performed by the first wireless communication method to the wireless connection destination information, when the first terminal is coupled to a display device, and not adding the information representing that communication is performed by the first wireless communication method to the wireless connection destination information, when the first terminal is not coupled to the display device.

2. The wireless communication device according to claim 1, wherein the first wireless communication circuit maintains communication by the first wireless communication method when a hot-plug-detect signal from the first terminal changes from on to off while communication by the first wireless communication method is being executed.

3. The wireless communication device according to claim 1, further comprising:

a second wireless communication circuit receiving second image information by a second wireless communication method that is different from the first wireless communication method; and a second terminal that is different from the first terminal, wherein the first wireless communication circuit decodes the first image information, the processor transmits the second image information to the display device via the second terminal when the second wireless communication circuit receives the second image information, and the display device decodes the second image information.

4. The wireless communication device according to claim 3, wherein the first terminal is an HDMI terminal, and the second terminal is a USB terminal.

5. A method for controlling a wireless communication device comprising:

wirelessly transmitting wireless connection destination information with information added thereto representing that communication is performed by a first wireless communication method, when a first terminal is coupled to a display device; and wirelessly transmitting the wireless connection destination information without the information added thereto representing that communication is performed by the first wireless communication method, when the first terminal is not coupled to the display device, wherein the wireless connection destination information enables communicative coupling to the wireless communication device.

6. The method for controlling the wireless communication device according to claim 5, further comprising:

receiving first image information by the first wireless communication method; and outputting the first image information to the display device.

\* \* \* \* \*